US011381979B2

(12) United States Patent
Richards

(10) Patent No.: US 11,381,979 B2
(45) Date of Patent: Jul. 5, 2022

(54) STANDALONE UNLICENSED SPECTRUM CARRIER AGGREGATION COMBINATIONS USING DYNAMIC FREQUENCY SELECTION (DFS) SPECTRUM

(71) Applicant: Telefonaktiebolaget LM Ericsson (publ), Stockholm (SE)

(72) Inventor: Christopher Richards, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 16/636,410

(22) PCT Filed: Sep. 10, 2018

(86) PCT No.: PCT/IB2018/056895
§ 371 (c)(1),
(2) Date: Feb. 4, 2020

(87) PCT Pub. No.: WO2019/058208
PCT Pub. Date: Mar. 28, 2019

(65) Prior Publication Data
US 2020/0178083 A1 Jun. 4, 2020

Related U.S. Application Data

(60) Provisional application No. 62/560,730, filed on Sep. 20, 2017.

(51) Int. Cl.
*H04L 12/28* (2006.01)
*H04W 16/14* (2009.01)
(Continued)

(52) U.S. Cl.
CPC ........... *H04W 16/14* (2013.01); *H04L 5/0032* (2013.01); *H04W 72/0453* (2013.01)

(58) Field of Classification Search
CPC ............ H04W 16/14; H04W 72/0453; H04W 74/0808; H04L 5/001
(Continued)

(56) References Cited

U.S. PATENT DOCUMENTS 9,363,805 B2 * 6/2016 Kim ...................... H04L 5/0053
2014/0016596 A1 * 1/2014 Kim ..................... H04W 72/042
370/329
(Continued)

OTHER PUBLICATIONS

Author Unknown, "3rd Generation Partnership Project; Technical Specification Group Radio Access Network Evolved Universal Terrestrial Radio Access (E-UTRA); Base Station (BS) radio transmission and reception (Release 14)," 3GPP TS 36.104 V14.3.0, Mar. 2017, 3GPP Organizational Partners, 223 pages.
(Continued)

*Primary Examiner* — John Pezzlo
(74) *Attorney, Agent, or Firm* — Withrow & Terranova, PLLC

(57) ABSTRACT

Embodiments of the present disclosure relate to defining and using unlicensed band, or sub-band, combinations for Carrier Aggregation (CA) for a wireless communication system that utilizes a standalone unlicensed technology (e.g., MulteFire or Fifth Generation (5G) New Radio (NR)). In general, a wireless device is configured with a CA combination that includes a Primary Cell (PCell) in a non-Dynamic Frequency Selection (DFS) spectrum and one or more Secondary Cells (SCells), at least one of which is in a DFS spectrum. In this manner, standalone operation in unlicensed spectrum utilizing DFS spectrum is provided.

16 Claims, 8 Drawing Sheets

(51) Int. Cl.
  *H04L 5/00* (2006.01)
  *H04W 72/04* (2009.01)
  *H04J 1/16* (2006.01)

(58) Field of Classification Search
  USPC ........................................ 370/252, 329, 445
  See application file for complete search history.

(56) References Cited

U.S. PATENT DOCUMENTS

2015/0065152 A1    3/2015   Sadek et al.
2015/0358827 A1*  12/2015   Bendlin ................ H04W 16/14
                                                          455/454

OTHER PUBLICATIONS

Author Unknown, "MulteFire Alliance; Technical Specification Terrestrial Radio Access (E-UTRA); User Equipment (UE) radio transmission and reception (Release 1.0)," MFA TS 36.101, V1.0.0, Table 5.5-1, Dec. 2017, 3GPP Organizational Partners, 1396 pages.

Bowden, Nigel, "The 5GHz 'Problem' for Wi-Fi Networks: DFS," WifiNigel, URL: http://wifinigel.blogspot.com/2018/05/the-5ghz-problem-for-wi-fi-networks-dfs.html, published May 27, 2018, 5 pages.

Quotient Associates, "Wi-Fi Spectrum Needs Study: Final Report," Feb. 2017, Quotient Associates Ltd., available at https://docplayer.net/54517347-Wi-fi-spectrum-needs-study-final-report-final-report-to-wi-fi-alliance-february-2017.html, 37 pages.

International Search Report and Written Opinion for International Application No. PCT/IB2018/056895, dated Nov. 6, 2018, 13 pages.

* cited by examiner

STANDALONE UNLICENSED SPECTRUM CARRIER AGGREGATION COMBINATIONS USING DYNAMIC FREQUENCY SELECTION (DFS) SPECTRUM

RELATED APPLICATIONS

This is a 35 U.S.C. § 371 national phase filing of International Application No. PCT/IB2018/056895, filed Sep. 10, 2018, which application claims the benefit of provisional patent application Ser. No. 62/560,730, filed Sep. 20, 2017, the disclosures of which are hereby incorporated herein by reference in their entireties.

TECHNICAL FIELD

The present disclosure relates to standalone Carrier Aggregation (CA) in an unlicensed frequency spectrum.

BACKGROUND

Third Generation Partnership Project (3GPP) added Carrier Aggregation (CA) in the Release (Rel) 10 specifications. CA allows multiple Long Term Evolution (LTE) carriers to be used simultaneously by a User Equipment device (UE), effectively increasing the available radio bandwidth that the UE can access. FIG. 1 illustrates three CA modes permitted in LTE, namely, an intra-band contiguous CA mode, an intra-band non-contiguous CA mode, and an inter-band non-contiguous CA mode. The 3GPP specifications define the permitted and allowed inter-band and intra-band carrier combinations. For LTE, the combinations can be found in 3GPP Technical Specification (TS) 36.104. Adding new combinations is done in each 3GPP release after agreement from the member organizations.

3GPP added License Assisted Access (LAA) to the Rel-13 specifications. LAA allows LTE to utilize unlicensed and license exempt spectrum in the 5 gigahertz (GHz) band (5150 megahertz (MHz) to approximately 5925 MHz currently). LAA is currently specified to operate as a Secondary Cell (SCell) to a licensed Primary Cell (PCell), e.g. non-standalone mode. CA band combinations for LAA were also added in Rel-13 and Rel-14. There are plans to add more combinations in Rel-15.

In the 5 GHz unlicensed and licensed exempt band, a large portion of the spectrum is also used by various commercial and military radar systems. These systems have priority of the spectrum use in the assigned frequencies. In the United States, these are termed the Dynamic Frequency Selection (DFS) channels. The DFS channels are grouped into the Unlicensed National Information Infrastructure 2 (U-NII 2) band in the United States. FIG. 2 illustrates the definition of U-NII 2 DFS band sub-bands 2A and 2C which require radar detection and certification. Other jurisdictions have a similar or even more extensive DFS band plan. In the United States, the DFS band consists of 355 MHz of spectrum—i.e., more than the non-DFS channels in U-NII 1 and U-NII 3 combined which is 225 MHz. This is a huge amount of spectrum. It is also widely agreed that the DFS channels are relatively lightly used (see, e.g., Quotient Associates, "Wi-Fi Spectrum Needs Study: Final Report," February 2017), either by radar systems or by other Mobile Broadband (MBB) technologies, e.g. Wi-Fi. Hence, there is growing interest in utilizing these frequencies for LAA, MulteFire, and Fifth Generation (5G) New Radio (NR) networks.

However, the DFS channels may only be used if the transmitting master device (e.g., MulteFire Access Point (AP) or LAA enhanced or evolved Node B (eNB) or Wi-Fi AP) can detect radar transmissions. This is enforced by regulatory requirements and certification procedures. Using Federal Communications Commission (FCC) DFS rules as an example herein, the rules stipulate that when a master device detects a radar transmission on a channel, the master device must vacate the channel, i.e. cease all transmissions, immediately. This means that all connected client devices (e.g., UEs or Wi-Fi stations) will lose their network connectivity. The master device may move to another channel (DFS or non-DFS) in order to resume operation and either explicitly inform the client devices of the new channel or let the client devices search the channels for the master device.

However, this stop-move-resume process can take several seconds or minutes to complete, during which time the client devices (e.g., UEs or Wi-Fi stations) receive no service, video or voice calls will be dropped, and all connection to the network and services will be suspended and probably lost, requiring manual reconnection.

With Wi-Fi, this is regarded as a major reason that the DFS channels are not extensively used or supported by manufacturers. IEEE 802.11 Wi-Fi does not support aggregation of independent carriers in the same way as 3GPP. In Wi-Fi systems, aggregated channels must be contiguous and are only defined to fall within the same sub-band (U-NII 1, U-NII 2, or U-NII 3)—the specifications currently do not allow IEEE 802.11 Wi-Fi channel aggregation to span U-NII bands. FIG. 3 illustrates an IEEE 802.11 Wi-Fi channel aggregation plan for the 5 GHz unlicensed band.

With LAA, the UE always has an anchor licensed PCell connection. So, in the event that the unlicensed cell is using a DFS channel and radar is detected, the UEs will fall back to the licensed PCell while a new unlicensed SCell is selected and brought into operation. LAA is often termed "non-standalone" because of the requirement of a licensed anchor PCell.

However, there are new technologies based on LAA (e.g., MulteFire) and 5G NR that do not require the use of a licensed PCell—often termed "standalone unlicensed." The PCell can be an unlicensed cell. Thus, when using conventional technology, MulteFire and 5G NR will have the same issues as Wi-Fi when attempting to utilize the DFS spectrum.

Using conventional technology, standalone technologies such as MulteFire and 5G NR (and Wi-Fi) are unlikely to make use of the radar spectrum because of the risk of connectivity loss to client devices when radar transmissions have been detected. Even today with Wi-Fi, the 355 MHz of 5 GHz spectrum is not well utilized because of this issue.

IEEE 802.11 Wi-Fi tries to reduce the impact of the problem by defining a "fast channel move" procedure. However, this procedure does not avoid the service and connectivity interruption; it only tries to reduce the duration. The connections and services must be re-established, e.g. voice calls, etc.

SUMMARY

Systems and methods are disclosed herein in which a User Equipment device (UE) is configured with a Carrier Aggregation (CA) combination configuration for standalone operation in unlicensed spectrum and in which the CA combination configuration utilizes Dynamic Frequency Selection (DFS) spectrum. Embodiments of a base station for a wireless communication system are disclosed. In some embodiments, a base station is configured to communicate with a UE and comprises processing circuitry configured to cause the base station to provide, to the UE, a CA combination configuration for the UE that comprises a Primary Cell (PCell) or Primary Component Carrier (PCC) for the UE in a non-DFS spectrum. The non-DFS spectrum is an unlicensed spectrum other than a DFS spectrum. The CA combination configuration for the UE further comprises one or more Secondary Cells (SCells) or Secondary Component Carriers (SCCs) for the UE, wherein the one or more SCells or the one or more SCCs for the UE comprise at least one SCell or SCC in a DFS spectrum. In this manner, the UE is configured to utilize CA in unlicensed spectrum in such a manner that enables uses of the DFS spectrum.

In some embodiments, the processing circuitry is further configured to cause the base station to operate in accordance with the CA combination configuration for the UE.

In some embodiments, the processing circuitry is further configured to cause the base station to configure one or more other network nodes to operate in accordance with the CA combination configuration for the UE.

In some embodiments, the processing circuitry is further configured to cause the base station to provide the CA combination configuration for the UE to another network node.

In some embodiments, the base station further comprises a radio interface, and the processing circuitry is further configured to cause the base station to provide the CA combination configuration to the UE via the radio interface.

In some embodiments, the wireless communication system is a cellular communication system.

Embodiments of a method implemented in a base station for a wireless communication system are also disclosed. In some embodiments, a method implemented in a base station for a wireless communication system comprises providing, to a UE, a CA combination configuration for the UE. The CA combination configuration comprises a PCell or PCC for the UE in a non-DFS spectrum, where the non-DFS spectrum is an unlicensed spectrum other than a DFS spectrum. The CA combination configuration further comprises one or more SCells or SCCs for the UE, wherein the one or more SCells or the one or more SCCs for the UE comprise at least one SCell or SCC in a DFS spectrum.

In some embodiments, the method further comprises operating in accordance with the CA combination configuration for the UE.

In some embodiments, the method further comprises configuring one or more other network nodes to operate in accordance with the CA combination configuration for the UE.

In some embodiments, the method further comprises providing the CA combination configuration for the UE to another network node.

In some embodiments, the base station comprises a radio interface, and providing the CA combination configuration to the UE comprises providing the CA combination configuration to the UE via the radio interface.

In some embodiments, the wireless communication system is a cellular communication system.

Embodiments of a UE for a wireless communication system are also disclosed. In some embodiments, a UE for a wireless communication system comprises a radio interface and processing circuitry configured to cause the UE to receive, from a base station via the radio interface, a CA combination configuration for the UE. The CA combination configuration for the UE comprises a PCell or PCC for the UE in a non-DFS spectrum, where the non-DFS spectrum is an unlicensed spectrum other than a DFS spectrum. The CA combination configuration further comprises one or more SCells or SCCs for the UE, wherein the one or more SCells or the one or more SCCs for the UE comprise at least one SCell or SCC in a DFS spectrum. The processing circuitry is further configured to cause the UE to operate in accordance with the CA combination configuration. In some embodiments, the wireless communication system is a cellular communication system.

Embodiments of a method implemented in a UE for a wireless communication system are also disclosed. In some embodiments, a method implemented in a UE for a wireless communication system comprises receiving, from a base station, a CA combination configuration for the UE. The CA combination configuration for the UE comprises a PCell or PCC for the UE in a non-DFS spectrum, where the non-DFS spectrum is an unlicensed spectrum other than a DFS spectrum. The CA combination configuration further comprises one or more SCells or SCCs for the UE, wherein the one or more SCells or the one or more SCCs for the UE comprise at least one SCell or SCC in a DFS spectrum. The method further comprises operating in accordance with the CA combination configuration. In some embodiments, the wireless communication system is a cellular communication system.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
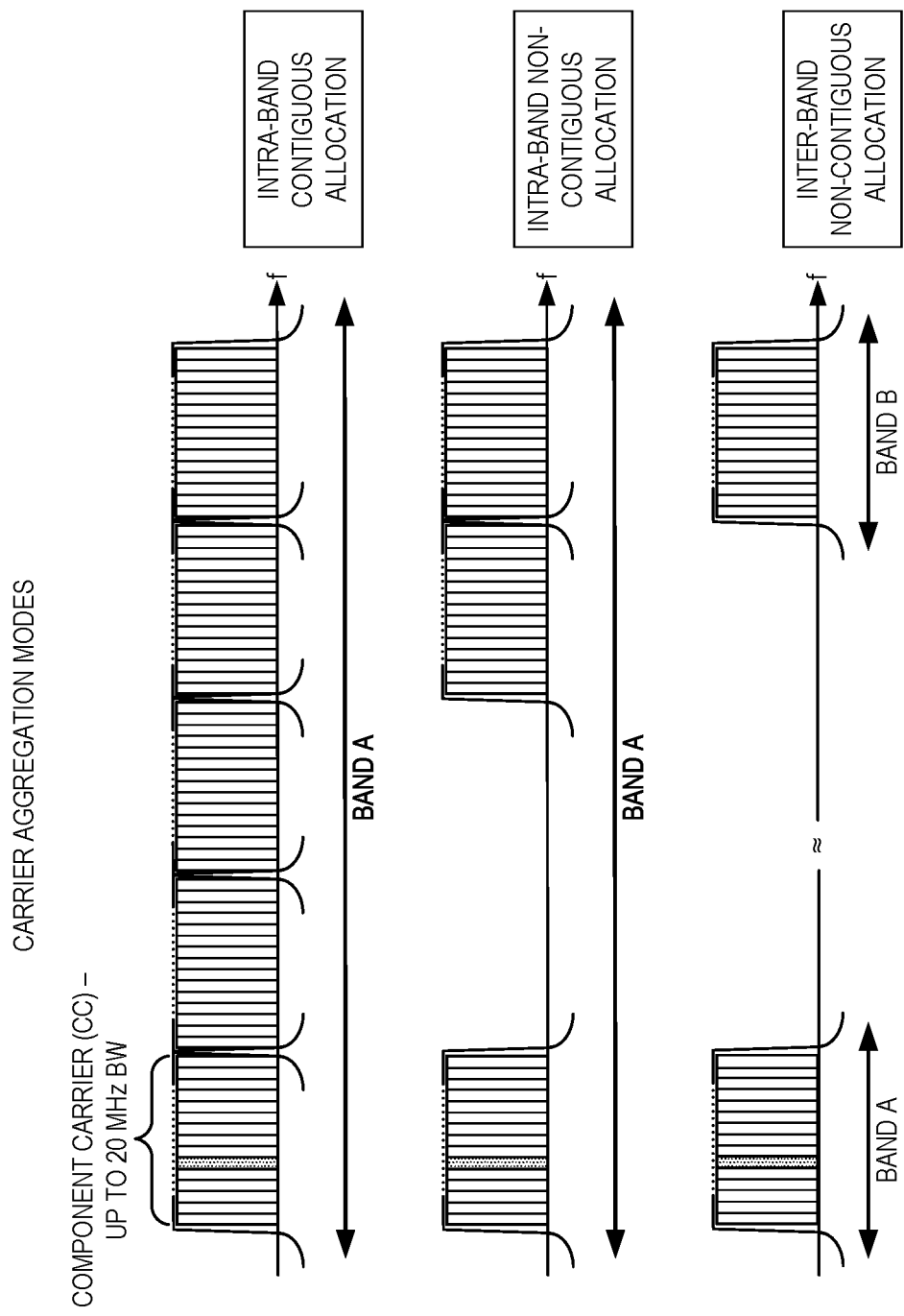
FIG. 1 illustrates Carrier Aggregation (CA) modes in Long Term Evolution (LTE)
Figure 2:
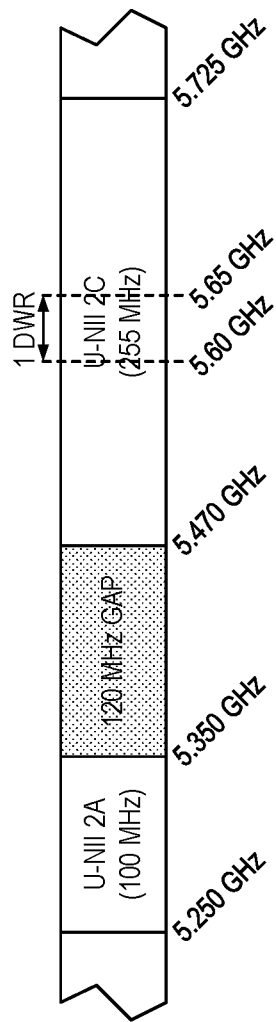
FIG. 2 illustrates the Federal Communications Commission (FCC) definition of Unlicensed National Information Infrastructure 2 (U-NII 2) Dynamic Frequency Selection (DFS) band sub-bands 2A and 2C which require radar detection and certification.
Figure 3:
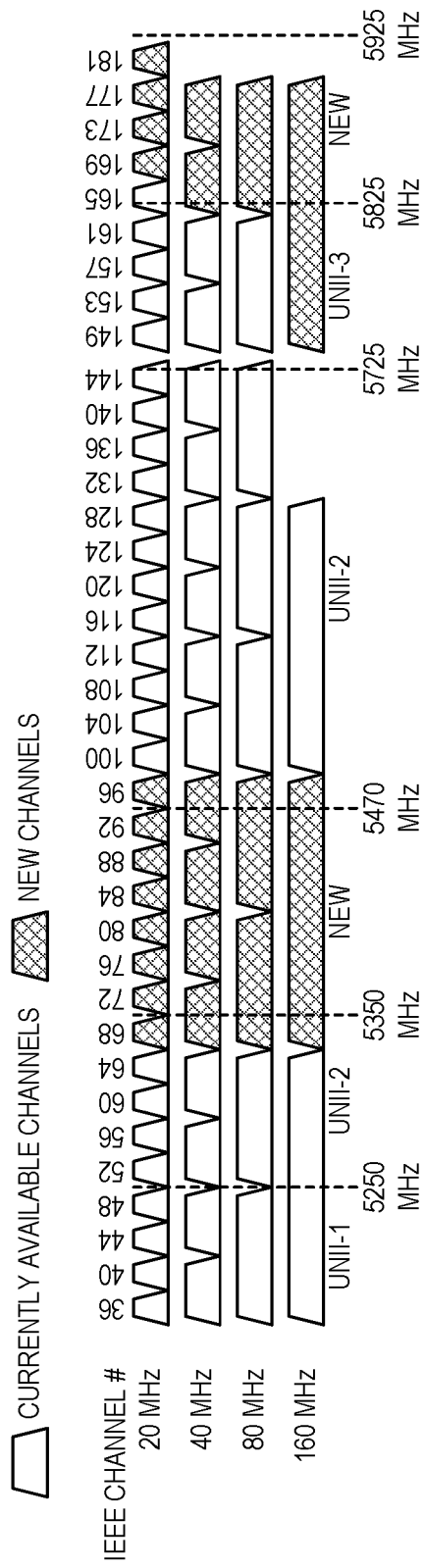
FIG. 3 illustrates an IEEE 802.11 Wi-Fi channel aggregation plan for the 5 gigahertz (GHz) unlicensed band.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Dynamic Frequency Selection (DFS) Spectrum:

As used herein, DFS spectrum is defined as an unlicensed spectrum (e.g., spectrum within the overall 5 gigahertz (GHz) unlicensed spectrum) in which commercial and/or military radar systems have priority. One example is the spectrum in which DFS channels are grouped into the Unlicensed National Information Infrastructure 2 (U-NII 2) band in the United States.

Non-DFS Spectrum:

As used herein, non-DFS spectrum is defined as an unlicensed spectrum (e.g., spectrum within the overall 5 GHz unlicensed spectrum) other than the DFS spectrum (i.e., spectrum in which commercial and/or military radar systems do not have priority).

New technologies based on License Assisted Access (LAA) (e.g., MulteFire) and Fifth Generation (5G) New Radio (NR) do not require the use of a licensed Primary Cell (PCell) and are often termed "standalone unlicensed." In these standalone unlicensed technologies, the PCell can be an unlicensed cell. Thus, when using conventional technology, MulteFire and 5G NR will have the same issues as Wi-Fi when attempting to utilize the DFS spectrum.

In order to address this issue, embodiments of the present disclosure define Carrier Aggregation (CA) combinations that ensure that at least one carrier in the carrier combination is not in the DFS spectrum. In this manner, standalone unlicensed technologies (e.g., MulteFire and 5G NR) can make use of the DFS channels and not have the same issues as Wi-Fi (stranding clients without connectivity when radar is detected). In the United States as an example, this will remove one of the main obstacles for using an additional 355 Megahertz (MHz) of spectrum (i.e., the DFS band). Currently, no such combination exists in 3GPP LAA, 5G, or the MulteFire Alliance specifications.

Some example advantages of embodiments of the present disclosure are as follows. Embodiments of the present disclosure remove one of the main obstacles for using an additional 355 MHz of spectrum in the 5 GHz unlicensed and license exempt bands. Embodiments of the present disclosure do not require changes to the MulteFire, LAA, or 5G NR protocol stack. Embodiments of the present disclosure can be implemented even ahead of inclusion in the relevant standards.

Embodiments of the present disclosure relate to defining and using unlicensed band, or sub-band, combinations for CA for a wireless communication system that utilizes a standalone unlicensed technology (e.g., MulteFire or 5G NR). While the focus of the discussion herein is on MulteFire and 5G NR, the present disclosure is equally applicable to any type of standalone unlicensed technology for a wireless communication system that supports CA.

For MulteFire and 3GPP NR, embodiments of the present disclosure define sets of unlicensed sub-band combinations that ensure the PCell is located in the non-DFS (radar) spectrum. New intra-band/inter-band contiguous and non-contiguous CA combinations are defined. For example, band 46A+band 46B or band 46A+band 46C or band 46D+band 46C or band 46D+band 46B.

TABLE 5.5

1A Sub-bands for Band 46
Table from 36.104 showing how the 5 GHz spectrum band 46 is divided into 4 sub-bands

| E-UTRA Operating Band | Uplink (UL) operating band BS receive UE transmit $F_{UL\ low}$-$F_{UL\ high}$ | Downlink (DL) operating band BS transmit UE receive $F_{DL\ low}$-$F_{DL\ high}$ |
|---|---|---|
| 46a | 5150 MHz-5250 MHz | 5150 MHz-5250 MHz |
| 46b | 5250 MHz-5350 MHz | 5250 MHz-5350 MHz |
| 46c | 5470 MHz-5725 MHz | 5470 MHz-5725 MHz |
| 46d | 5725 MHz-5925 MHz | 5725 MHz-5925 MHz |

Once CA band combinations have been defined, device manufacturers (User Equipment device (UE) and enhanced or evolved Node B (eNB)) will be able to start building support for the DFS channels into their products. For most devices this can be accomplished by a software upgrade of the device.

For LAA, which currently is only defined in Third Generation Partnership Project (3GPP) for non-standalone mode, once the specifications have been updated to allow LAA operation in standalone mode, similar CA combinations can be introduced as for MulteFire and 5G NR into 3GPP Technical Specification (TS) 36.104.

Embodiments of the present disclosure allow for the use of the radar (DFS) spectrum while providing an unlicensed anchor carrier outside of the radar spectrum for standalone unlicensed technologies that use CA.

Current standalone unlicensed technologies are MulteFire and 5G NR. However, there are discussions on-going in 3GPP to enhance the existing LAA definition to operate in standalone mode. This may happen as soon as Release (Rel) 15.

Embodiments of the present disclosure define CA band combinations for MulteFire, 5G NR, and LAA that ensure at least the PCell is in an unlicensed non-radar sub-band while one or more Secondary Cells (SCells) may be located in the unlicensed radar spectrum.

Embodiments of the present disclosure can be extended to enhance the IEEE 802.11 Wi-Fi specifications and channel aggregation rules to allow for contiguous and non-contiguous aggregation (similar to 3GPP, MulteFire, 5G NR) and define an aggregation profile that ensures at least one carrier of the non-radar spectrum is combined with one or more carriers in the radar spectrum.

Figure 4:
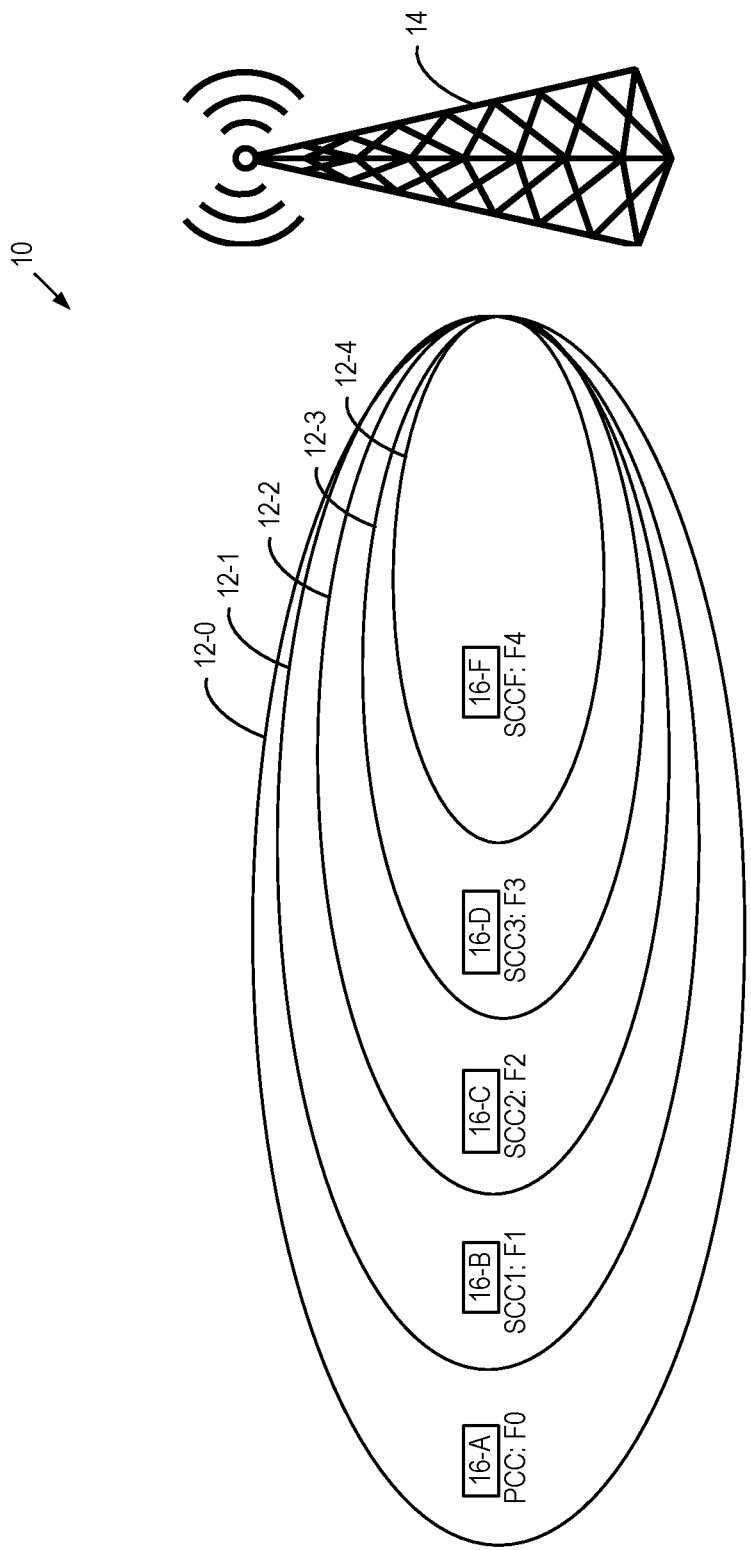
FIGS. 4 and 5 are examples of a wireless communication system in which embodiments of the present disclosure may be implemented.

In this regard, FIG. 4 illustrates one example of a wireless communication system 10 in which embodiments of the present disclosure may be implemented. The wireless communication system 10 uses a standalone unlicensed technology (e.g., MulteFire or 5G NR). Further, the wireless communication system 10 uses CA. In this example, cells 12-0 through 12-4, having carrier frequencies F0, F1, F2, F3, and F4, respectively, can be aggregated. Each of the carrier frequencies is in an unlicensed spectrum such as, e.g., the 5 GHz unlicensed spectrum. Note that while there are five frequencies in this example, there may be any number of two or more carrier frequencies and combinations of any two or more of those carrier frequencies can be selected as a CA combination. In this example, the cells 12-0 through 12-4 are transmitted by a single radio access node 14 (e.g., a MulteFire base station or a NR base station (gNB) in 5G NR). A radio access node may also be referred to herein, at least in some instances, as a base station. With respect to a particular wireless device 16, one of the cells 12-0 through 12-4 serves as a PCell of the wireless device 16, where the PCell handles the Radio Resource Control (RRC) connection. Note that the terms "wireless device" and "UE" are used herein interchangeably, without loss of generality. The carrier of the PCell (also referred to as a component carrier) is referred to as the Primary Component Carrier (PCC). Other cells aggregated with the PCell for the wireless device 16 are referred to as SCells having corresponding Secondary Component Carriers (SCCs). All of the aggregated cells for the wireless device 16 are referred to as serving cells of the wireless device 16.

The coverage areas of the cells 12-0 through 12-4 may differ either due to different component carrier frequencies or due to power planning on the different component carriers. In the example of FIG. 4, the cell 12-0 has the largest coverage area and serves as the PCell for wireless devices 16-A, 16-B, 16-C, 16-D, and 16-F located in the cell 12-0. The cells 12-1 through 12-4 have successively smaller coverage areas and may serve as SCells for the wireless devices 16-B through 16-F. In this example, the wireless device 16-A has no SCell coverage, the wireless device 16-B has SCell coverage for one SCell (namely cell 12-1), the wireless device 16-C has SCell coverage for two SCells (namely cells 12-1 and 12-2), the wireless device 16-D has SCell coverage for three SCells (namely cells 12-1, 12-2, and 12-3), and the wireless device 16-F has SCell coverage for four SCells (namely cells 12-1, 12-2, 12-3, and 12-4). Therefore, depending on the position of a wireless device 16 within the PCell 12-0, the wireless device 16 may have no SCell coverage or may have coverage of one or more SCells.

Figure 5:
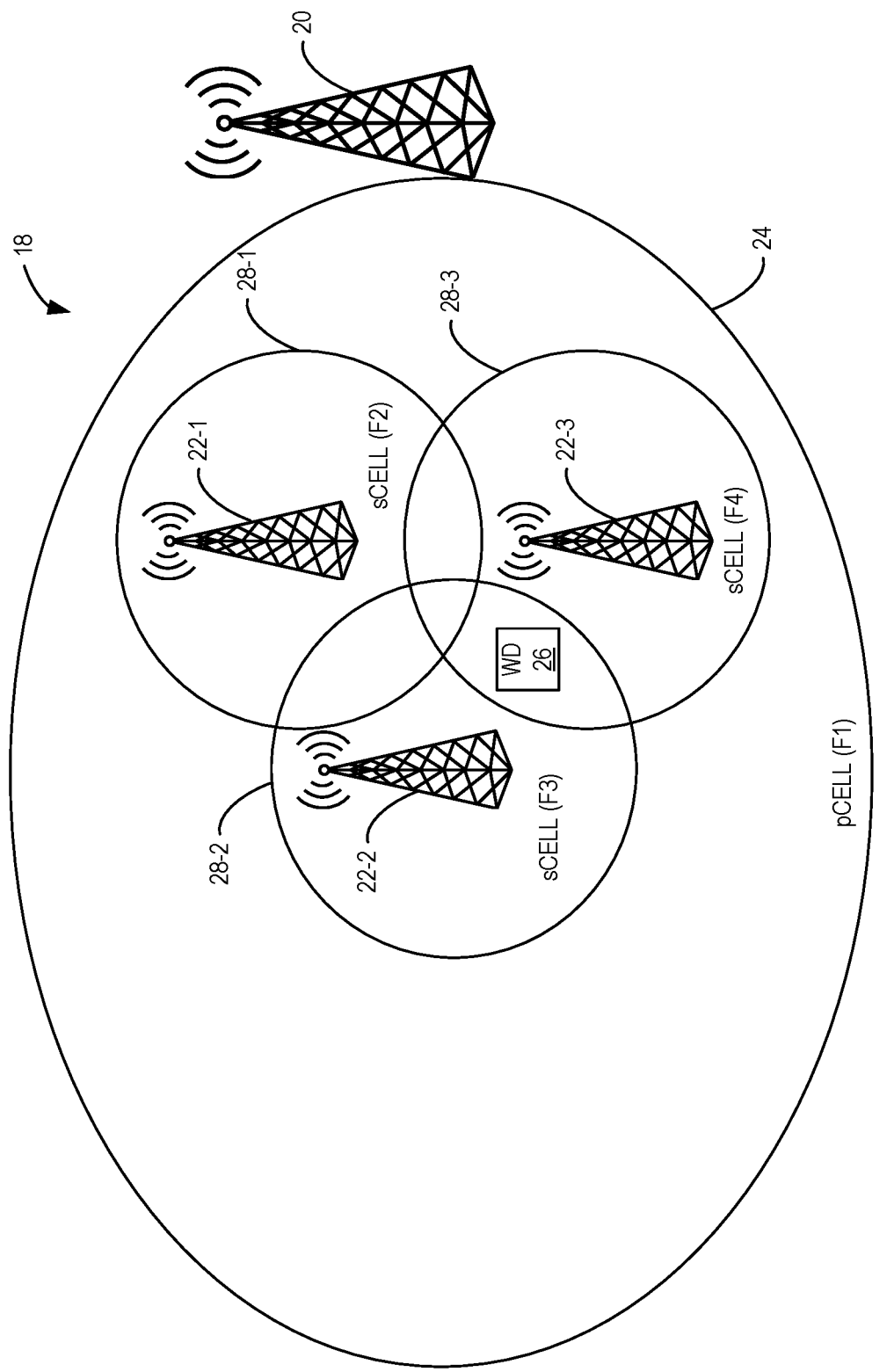

FIG. 5 illustrates another example of a wireless communication system 18 in which embodiments of the present disclosure may be implemented. This example is similar to that of FIG. 4 but where cells are served by different radio access nodes. The wireless communication system 18 uses a standalone unlicensed technology (e.g., MulteFire or 5G NR). Further, the wireless communication system 18 uses CA. As illustrated, the wireless communication system 18 includes a high power radio access node 20 (e.g., a Multe-Fire base station or 5G NR gNB) and a number of low power radio access nodes 22-1 through 22-3 (e.g., Remote Radio Heads (RRHs)). In this example, the radio access node 20 serves a cell 24 (which may be referred to herein as a macro cell 24) that is a serving cell, and more particularly a PCell, for a wireless device 26 located within a coverage area of the cell 24. As such, the cell 24 is also referred to herein as the PCell 24 of the wireless device 26. As used herein, the coverage area of a cell (e.g., the coverage area of the PCell 24) is a geographic area covered by the cell. The radio access nodes 22-1 through 22-3 serve corresponding small cells 28-1 through 28-3. One or more of the small cells 28 are selected and configured as serving SCells of the wireless device 26 and, as such, are referred to herein as SCells 28 of the wireless device 26. Note that while the macro cell 24 is the PCell in this example, the macro cell 24 may, in another example, be a SCell. For instance, using the wireless device 26 as an example, the small cell 28-2 may alternatively be the PCell for the wireless device 26 and the macro cell 24 may alternatively be a SCell for the wireless device 26.

Figure 6:
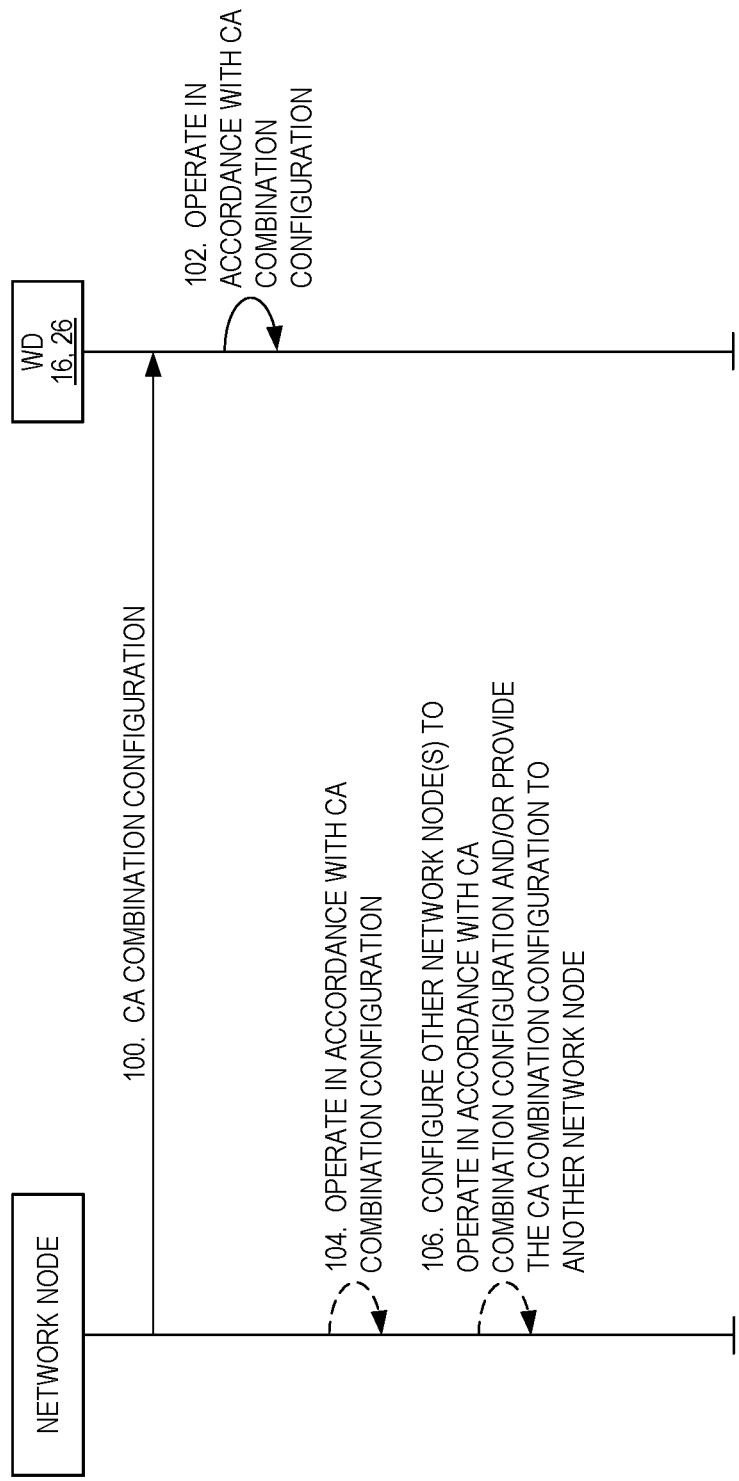
FIG. 6 illustrates the operation of a network node and a wireless device in accordance with embodiments of the present disclosure.

Embodiments of the present disclosure define sets of unlicensed sub-band combinations that ensure that the PCell for a wireless device (e.g., one of the wireless devices 16 of FIG. 4 or the wireless device 26 of FIG. 5) is located in non-DFS spectrum. The SCell(s) selected and configured for the wireless device may be in non-DFS spectrum or DFS spectrum. In this regard, FIG. 6 illustrates the operation of a network node (e.g., a radio access node such as the radio access node 14 of FIG. 4 or one of the radio access nodes 20 or 22 of FIG. 5 or a core network node) and a wireless device (e.g., one of the wireless devices 16 of FIG. 4 or the wireless device 26 of FIG. 5) in accordance with embodiments of the present disclosure. The network node configures the wireless device with a CA combination (i.e., a combination of CA component carriers) that includes a PCell (or analogously a PCC) in non-DFS spectrum and a SCell (or analogously a SCC(s)) that may be in DFS spectrum.

As illustrated, the network node configures the wireless device 16, 26 with a CA combination (step 100). The CA combination includes a PCell (or analogously a PCC) for the wireless device 16, 26 that is in non-DFS spectrum and one or more SCells for the wireless device 16, 26. The CA combination configured for the wireless device 16, 26 is selected from a set of possible CA combinations. The set of possible CA combinations may be defined based on a defined combination of sub-bands within unlicensed spectrum. For example, one or more sub-bands may be defined as non-DFS sub-bands (i.e., sub-bands that can be used for PCells and/or SCells) and one or more other sub-bands may be defined as DFS sub-bands (i.e., sub-bands that can only be used for SCells). For each possible CA combination in the set, the PCell for that CA combination is in non-DFS spectrum. At least one of the possible CA combinations (and preferably multiple possible CA combinations) includes one or more SCells that are in DFS spectrum. In the example of FIG. 6, the selected CA combination that is configured for the wireless device 16, 26 includes one or more SCells, at least one of which is in DFS spectrum.

Note that any conventional or later developed PCell and SCell selection process may be used to select the CA combination configured for the wireless device 16, 26. For example, the PCell may be selected for the wireless device 16, 26 from among all possible serving cells available to the wireless device 16, 26 that operate in non-DFS spectrum. One or more SCells may be selected for the wireless device 16, 26 from among all possible serving cells available to the wireless device 16, 26 that operate in either DFS or non-DFS spectrum. The set of possible CA combinations may include all possible combinations of a non-DFS spectrum PCell and one or more DFS or non-DFS SCells(s), or the set of possible CA combinations of may be a limited set of combinations of a non-DFS spectrum PCell and one or more DFS or non-DFS SCell(s).

The wireless device 16, 26 receives the CA combination configuration from the network node and operates in accordance with the CA combination configuration (step 102). The details of how the wireless device 16, 26 operates in accordance with the configured CA combination configuration are known to those of ordinary skill in the art and, as such, will not be repeated. The configured CA combination may be used for uplink CA and/or downlink CA.

Optionally (as indicated by dashed lines), the network node operates in accordance with the CA combination configuration for the wireless device 16, 26 (step 104) and/or configures one or more other network nodes to operate in accordance with the CA combination configuration for the wireless device 16, 26 and/or provides the CA combination configuration for the wireless device 16, 26 to another network node (step 106). For example, if the network node is the radio access node 14 of FIG. 4, the radio access node 14 serves (transmits to and receives from) the wireless device 16 in accordance with the CA combination configured for the wireless device 16. As another example, if the network node is the radio access node 20 of FIG. 5, the radio access node 20 configures the other radio access node(s) 22 to, together with the radio access node 20, serve the wireless device 26 in accordance with the CA combination configured for the wireless device 26. As yet another example, if the network node is a core network node or some other node (e.g., a host computer), the network node configures the radio access node 14 of FIG. 4 or the radio access nodes 20 and 22 of FIG. 5 to serve the wireless device 16, 26 in accordance with the CA combination configured for the wireless device 16, 26.

Figure 7:
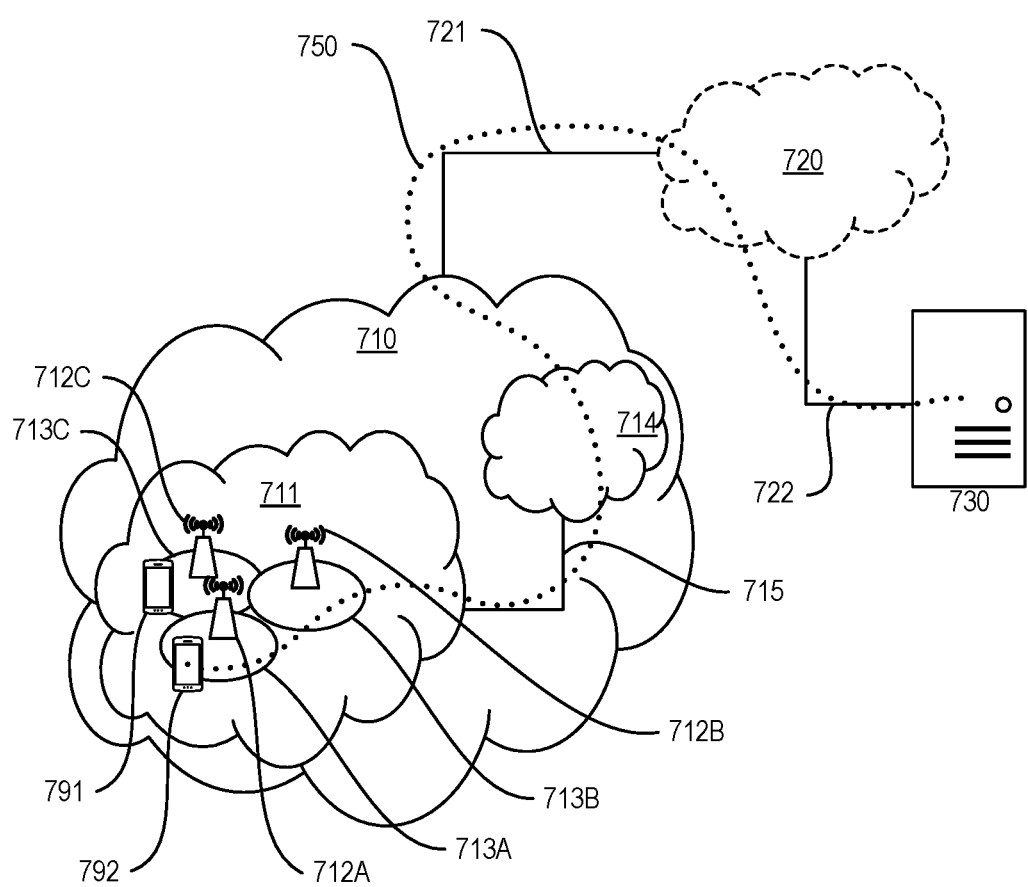
FIG. 7 schematically illustrates a telecommunication network connected via an intermediate network to a host computer.

With reference to FIG. 7, in accordance with an embodiment, a communication system includes a telecommunication network 710, such as a 3GPP-type cellular network, which comprises an access network 711, such as a Radio Access Network (RAN), and a core network 714. The access network 711 comprises a plurality of base stations 712A, 712B, 712C, such as Node Bs (NBs), eNBs, gNBs, or other types of wireless Access Points (APs), each defining a corresponding coverage area 713A, 713B, 713C. One or more of the base stations 712A, 712B, 712C correspond to the radio access node 14 of FIG. 4 or 5 described above and operates to provide CA as described herein. Each base station 712A, 712B, 712C is connectable to the core network 714 over a wired or wireless connection 715. A first UE 791 located in coverage area 713C is configured to wirelessly connect to, or be paged by, the corresponding base station 712C. A second UE 792 in coverage area 713A is wirelessly connectable to the corresponding base station 712A. While a plurality of UEs 791, 792 are illustrated in this example, the disclosed embodiments are equally applicable to a situation where a sole UE is in the coverage area or where a sole UE is connecting to the corresponding base station 712. Further, while the coverage areas 713A, 713B, 713C are shown for simplicity, any of the base stations 712A, 712B, 712C that provides CA may serve multiple cells or component carriers, each of which may have a different coverage area as described above with respect to FIGS. 4 and 5.

The telecommunication network 710 is itself connected to a host computer 730, which may be embodied in the hardware and/or software of a standalone server, a cloud-implemented server, a distributed server, or as processing resources in a server farm. The host computer 730 may be under the ownership or control of a service provider, or may be operated by the service provider or on behalf of the service provider. Connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private, or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an Over-The-Top (OTT) connection 750. The host computer 730 and the connected UEs 791, 792 are configured to communicate data and/or signaling via the OTT connection 750, using the access network 711, the core network 714, any intermediate network 720, and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station, and host computer discussed in the preceding paragraphs will now be described with reference to FIG. 8. Note that that the details provided herein regarding the base station and the UE are also applicable to the radio access nodes 14, 20, and 22 of FIGS. 4 and 5. Likewise, the details provided here for the UE are also applicable to the wireless device 16, 26 of FIGS. 4 and 5.

In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays, or combinations of these (not shown) adapted to execute instructions. The host computer 810 further comprises software 811, which is stored in or is accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays, or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays, or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
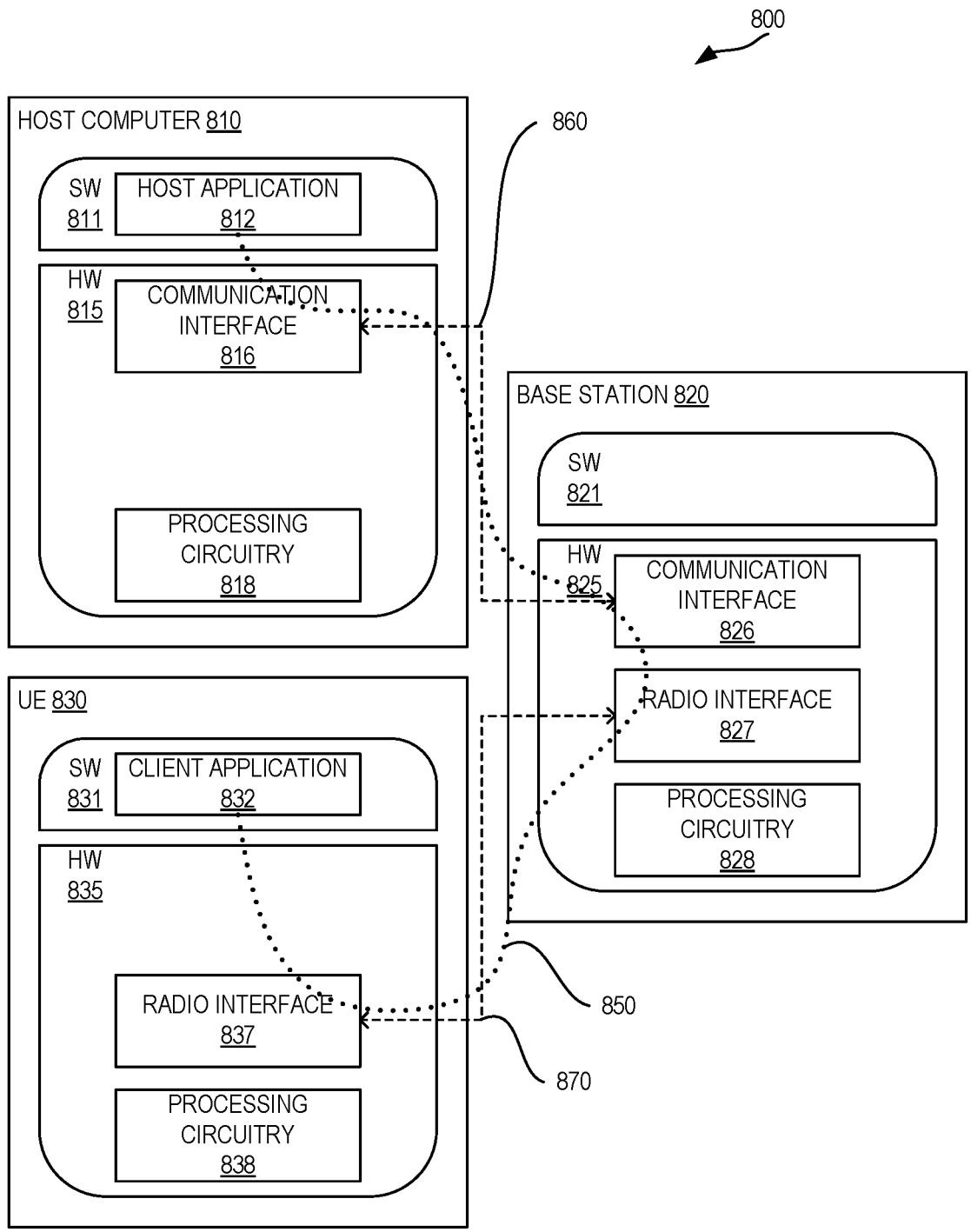
FIG. 8 is a generalized block diagram of a host computer communicating via a base station with a User Equipment device (UE) over a partially wireless connection.

It is noted that the host computer 810, the base station 820, and the UE 830 illustrated in FIG. 8 may be identical to the host computer 730, one of the base stations 712A, 712B, 712C, and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the performance of the RAN, particularly for standalone unlicensed operation when using DFS spectrum, and thereby provide benefits such as improved user experience.

A measurement procedure may be provided for the purpose of monitoring data rate, latency, and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing, etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency, and the like. The measurements may be implemented in that the software 811, 831 causes messages to be transmitted, in particular empty or 'dummy' messages, using the OTT connection 850 while it monitors propagation times, errors, etc.

Figure 9:
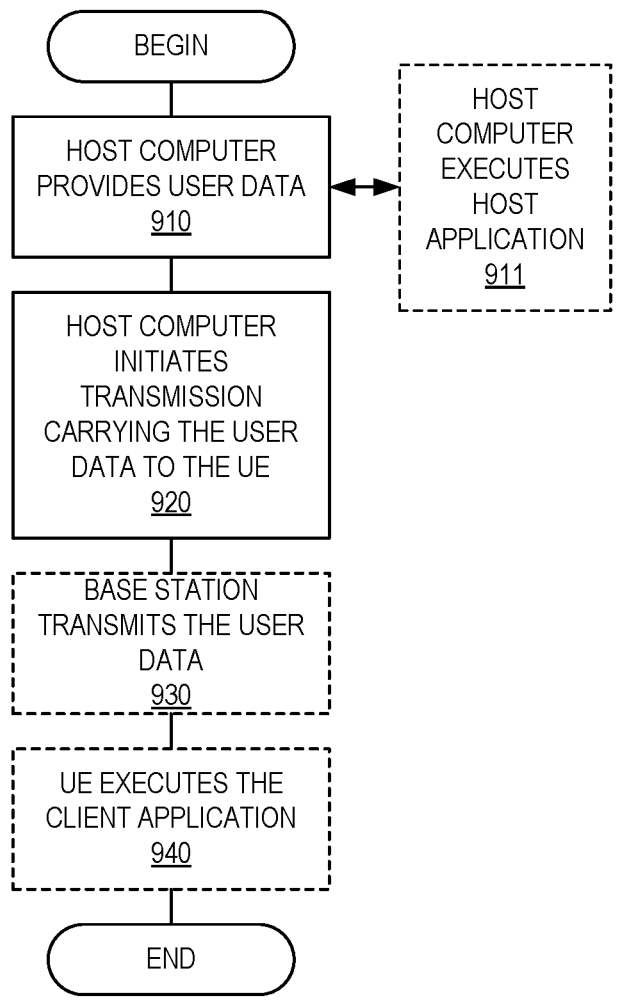
FIGS. 9 and 10 are flowcharts illustrating methods implemented in a communication system including a host computer, a base station, and a UE.

FIG. 9 is a flowchart illustrating a method implemented in a communication system, in accordance with one embodiment. The communication system includes a host computer, a base station, and a UE which may be those described with reference to FIGS. 7 and 8. For simplicity of the present disclosure, only drawing references to FIG. 9 will be included in this section. In a first step 910 of the method, the host computer provides user data. In an optional sub-step 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

Figure 10:
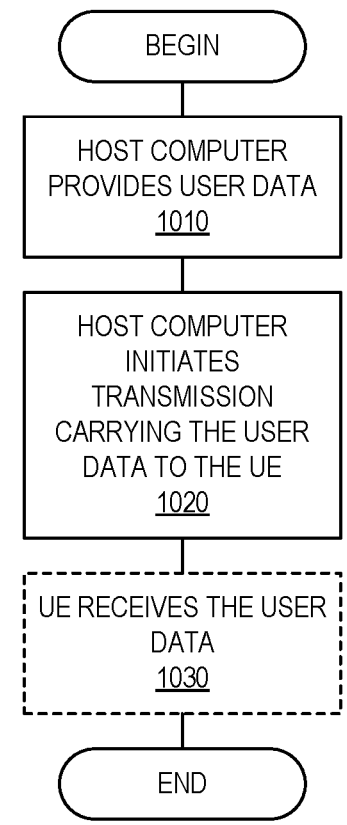

FIG. 10 is a flowchart illustrating a method implemented in a communication system, in accordance with one embodiment. The communication system includes a host computer, a base station, and a UE which may be those described with reference to FIGS. 7 and 8. For simplicity of the present disclosure, only drawing references to FIG. 10 will be included in this section. In a first step 1010 of the method, the host computer provides user data. In an optional sub-step (not shown), the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

While not being limited thereto, some example embodiments of the present disclosure are provided below.

Embodiment 1

A base station configured to communicate with a User Equipment (UE), the base station comprising a radio interface and processing circuitry configured to provide, to the UE, a Carrier Aggregation (CA) combination configuration for the UE that comprises a Primary Cell (PCell) for the UE in a non-Dynamic Frequency Selection (DFS) spectrum and one or more Secondary Cells (SCells) for the UE, wherein the one or more SCells for the UE comprise at least one SCell in a DFS spectrum.

Embodiment 2

The base station of embodiment 1 wherein the processing circuitry is further configured to cause the base station to operate in accordance with the CA combination configuration for the UE.

Embodiment 3

The base station of embodiment 1 or 2 wherein the processing circuitry is further configured to configure one or more other network nodes to operate in accordance with the CA combination configuration for the UE.

Embodiment 4

The base station of any one of embodiments 1 to 3 wherein the processing circuitry is further configured to provide the CA combination configuration for the UE to another network node.

Embodiment 5

A communication system including a host computer comprising: processing circuitry configured to provide user data; and a communication interface configured to forward the user data to a cellular network for transmission to a User Equipment (UE), wherein the cellular network comprises a base station having a radio interface and processing circuitry, the base station's processing circuitry configured to provide, to the UE, a Carrier Aggregation (CA) combination configuration for the UE that comprises a Primary Cell (PCell) for the UE in a non-Dynamic Frequency Selection (DFS) spectrum and one or more Secondary Cells (SCells) for the UE, wherein the one or more SCells for the UE comprise at least one SCell in a DFS spectrum.

Embodiment 6

The communication system of embodiment 5, further including the base station.

Embodiment 7

The communication system of embodiment 6, further including the UE, wherein the UE is configured to communicate with the base station.

Embodiment 8

The communication system of embodiment 7, wherein: the processing circuitry of the host computer is configured to execute a host application, thereby providing the user data; and the UE comprises processing circuitry configured to execute a client application associated with the host application.

Embodiment 9

A method implemented in a base station, comprising: providing (100), to a UE, a Carrier Aggregation (CA) combination configuration for the UE that comprises a Primary Cell (PCell) for the UE in a non-Dynamic Frequency Selection (DFS) spectrum and one or more Secondary Cells (SCells) for the UE, wherein the one or more SCells for the UE comprise at least one SCell in a DFS spectrum.

Embodiment 10

The method of embodiment 9 wherein the method further comprises operating (104) in accordance with the CA combination configuration for the UE.

Embodiment 11

The method of embodiment 9 or 10 further comprising configuring (106) one or more other network nodes to operate in accordance with the CA combination configuration for the UE.

Embodiment 12

The method of any one of embodiments 9 to 11 further comprising providing (106) the CA combination configuration for the UE to another network node.

Embodiment 13

A method implemented in a communication system including a host computer, a base station and a User Equipment (UE), the method comprising: at the host computer, providing user data; and at the host computer, initiating a transmission carrying the user data to the UE via a cellular network comprising the base station, wherein the base station provides, to the UE, a Carrier Aggregation (CA) combination configuration for the UE that comprises a Primary Cell (PCell) for the UE in a non-Dynamic Frequency Selection (DFS) spectrum and one or more Secondary Cells (SCells) for the UE, wherein the one or more SCells for the UE comprise at least one SCell in a DFS spectrum.

Embodiment 14

The method of embodiment 13, further comprising: at the base station, transmitting the user data.

Embodiment 15

The method of embodiment 14, wherein the user data is provided at the host computer by executing a host application, the method further comprising: at the UE, executing a client application associated with the host application.

Embodiment 16

A User Equipment (UE) configured to communicate with a base station, the UE comprising a radio interface and processing circuitry configured to: receive, from the base station, a Carrier Aggregation (CA) combination configuration for the UE that comprises a Primary Cell (PCell) for the UE in a non-Dynamic Frequency Selection (DFS) spectrum and one or more Secondary Cells (SCells) for the UE, wherein the one or more SCells for the UE comprise at least one SCell in a DFS spectrum; and operate in accordance with the CA combination configuration.

Embodiment 17

A communication system including a host computer comprising: processing circuitry configured to provide user data; and a communication interface configured to forward user data to a cellular network for transmission to a User Equipment (UE), wherein the UE comprises a radio interface and processing circuitry, the UE's processing circuitry configured to: receive, from the base station, a Carrier Aggregation (CA) combination configuration for the UE that comprises a Primary Cell (PCell) for the UE in a non-Dynamic Frequency Selection (DFS) spectrum and one or more Secondary Cells (SCells) for the UE, wherein the one or more SCells for the UE comprise at least one SCell in a DFS spectrum; and operate in accordance with the CA combination configuration.

Embodiment 18

The communication system of embodiment 17, further including the UE.

Embodiment 19

The communication system of embodiment 18, wherein the cellular network further includes a base station configured to communicate with the UE.

Embodiment 20

The communication system of embodiment 18 or 19, wherein: the processing circuitry of the host computer is configured to execute a host application, thereby providing the user data; and the UE's processing circuitry is configured to execute a client application associated with the host application.

Embodiment 21

A method implemented in a User Equipment (UE), comprising: receiving (100), from the base station, a Carrier Aggregation (CA) combination configuration for the UE that comprises a Primary Cell (PCell) for the UE in a non-Dynamic Frequency Selection (DFS) spectrum and one or more Secondary Cells (SCells) for the UE, wherein the one or more SCells for the UE comprise at least one SCell in a DFS spectrum; and operating (102) in accordance with the CA combination configuration.

Embodiment 22

A method implemented in a communication system including a host computer, a base station, and a User Equipment (UE), the method comprising: at the host computer, providing user data; and at the host computer, initiating a transmission carrying the user data to the UE via a cellular network comprising the base station, wherein the UE: receives, from the base station, a Carrier Aggregation (CA) combination configuration for the UE that comprises a Primary Cell (PCell) for the UE in a non-Dynamic Frequency Selection (DFS) spectrum and one or more Secondary Cells (SCells) for the UE, wherein the one or more SCells for the UE comprise at least one SCell in a DFS spectrum; and operates in accordance with the CA combination configuration.

Embodiment 23

The method of embodiment 22, further comprising: at the UE, receiving the user data from the base station.

At least some of the following abbreviations may be used in this disclosure. If there is an inconsistency between abbreviations, preference should be given to how it is used above. If listed multiple times below, the first listing should be preferred over any subsequent listing(s).
  3GPP Third Generation Partnership Project
  5G Fifth Generation
  AP Access Point
  CA Carrier Aggregation
  DFS Dynamic Frequency Selection
  eNB Enhanced or Evolved Node B
  FCC Federal Communications Commission
  GHz Gigahertz
  gNB New Radio Base Station
  LAA License Assisted Access
  LTE Long Term Evolution
  MBB Mobile Broadband
  MHz Megahertz
  NB Node B
  NR New Radio
  OTT Over-The-Top
  PCC Primary Component Carrier
  PCell Primary Cell
  RAN Radio Access Node
  Rel Release
  RRC Radio Resource Control
  RRH Remote Radio Head
  SCC Secondary Component Carrier
  SCell Secondary Cell
  TS Technical Specification
  UE User Equipment
  U-NII Unlicensed National Information Infrastructure Those skilled in the art will recognize improvements and modifications to the embodiments of the present disclosure. All such improvements and modifications are considered within the scope of the concepts disclosed herein.

What is claimed is:

1. A base station for a wireless communication system, the base station configured to communicate with a User Equipment, UE, and comprising:
  processing circuitry configured to cause the base station to provide, to the UE, a single Carrier Aggregation, CA, combination configuration for the UE that comprises:
    a Primary Cell, PCell, or Primary Component Carrier, PCC, for the UE in a non-Dynamic Frequency Selection, DFS, spectrum, the non-DFS spectrum being an unlicensed spectrum other than a DFS spectrum; and
    one or more Secondary Cells, SCells, or Secondary Component Carriers, SCCs, for the UE, wherein the one or more SCells or the one or more SCCs for the UE comprise at least one SCell or SCC in a DFS spectrum, wherein the DFS spectrum comprises an unlicensed spectrum in which one or more of a commercial radar system or a military radio system are prioritized.

2. The base station of claim 1 wherein the processing circuitry is further configured to cause the base station to operate in accordance with the CA combination configuration for the UE.

3. The base station of claim 1 wherein the processing circuitry is further configured to cause the base station to configure one or more other network nodes to operate in accordance with the CA combination configuration for the UE.

4. The base station of claim 1 wherein the processing circuitry is further configured to cause the base station to provide the CA combination configuration for the UE to another network node.

5. The base station of claim 1 further comprising a radio interface, wherein the processing circuitry is further configured to cause the base station to provide the CA combination configuration to the UE via the radio interface.

6. The base station of claim 1 wherein the wireless communication system is a cellular communication system.

7. A method implemented in a base station for a wireless communication system, comprising:
providing to a User Equipment, UE, a single Carrier Aggregation, CA, combination configuration for the UE that comprises:
a Primary Cell, PCell, or Primary Component Carrier, PCC, for the UE in a non-Dynamic Frequency Selection, DFS, spectrum, the non-DFS spectrum being an unlicensed spectrum other than a DFS spectrum; and
one or more Secondary Cells, SCells, or Secondary Component Carriers, SCCs, for the UE, wherein the one or more SCells or the one or more SCCs for the UE comprise at least one SCell or SCC in a DFS spectrum, wherein the DFS spectrum comprises an unlicensed spectrum in which one or more of a commercial radar system or a military radio system are prioritized.

8. The method of claim 7 wherein the method further comprises operating in accordance with the CA combination configuration for the UE.

9. The method of claim 7 further comprising configuring one or more other network nodes to operate in accordance with the CA combination configuration for the UE.

10. The method of claim 7 further comprising providing the CA combination configuration for the UE to another network node.

11. The method of claim 7 wherein the base station comprises a radio interface, and providing the CA combination configuration to the UE comprises providing the CA combination configuration to the UE via the radio interface.

12. The method of claim 7 wherein the wireless communication system is a cellular communication system.

13. A User Equipment, UE, for a wireless communication system, the UE configured to communicate with a base station and comprising:
a radio interface; and
processing circuitry configured to cause the UE to:
receive, from the base station via the radio interface, a single Carrier Aggregation, CA, combination configuration for the UE that comprises:
a Primary Cell, PCell, or Primary Component Carrier, PCC, for the UE in a non-Dynamic Frequency Selection, DFS, spectrum, the non-DFS spectrum being an unlicensed spectrum other than a DFS spectrum; and
one or more Secondary Cells, SCells, or Secondary Component Carriers, SCCs, for the UE, wherein the one or more SCells or the one or more SCCs for the UE comprise at least one SCell or SCC in a DFS spectrum, wherein the DFS spectrum comprises an unlicensed spectrum in which one or more of a commercial radar system or a military radio system are prioritized; and
operate in accordance with the CA combination configuration.

14. The UE of claim 13 wherein the wireless communication system is a cellular communication system.

15. A method implemented in a User Equipment, UE, for a wireless communication system, comprising:
receiving, from a base station, a single Carrier Aggregation, CA, combination configuration for the UE that comprises:
a Primary Cell, PCell, or Primary Component Carrier, PCC, for the UE in a non-Dynamic Frequency Selection, DFS, spectrum, the non-DFS spectrum being an unlicensed spectrum other than a DFS spectrum; and
one or more Secondary Cells, SCells, or Secondary Component Carriers, SCCs, for the UE, wherein the one or more SCells or the one or more SCCs for the UE comprise at least one SCell or SCC in a DFS spectrum, wherein the DFS spectrum comprises an unlicensed spectrum in which one or more of a commercial radar system or a military radio system are prioritized; and
operating in accordance with the CA combination configuration.

16. The method of claim 15 wherein the wireless communication system is a cellular communication system.

* * * * *